(12) United States Patent
Hunter et al.

(10) Patent No.: US 9,011,616 B2
(45) Date of Patent: Apr. 21, 2015

(54) OPTIMIZING THE SHAPE OF A COMPOSITE STRUCTURE

(75) Inventors: Ethan W. Hunter, Havertown, PA (US); Thomas J. Falasco, Broomall, PA (US); Kurt M. Swanson, Media, PA (US)

(73) Assignee: The Boeing Company, Chicago, IL (US)

( * ) Notice: Subject to any disclaimer, the term of this patent is extended or adjusted under 35 U.S.C. 154(b) by 1375 days.

(21) Appl. No.: 12/202,240

(22) Filed: Aug. 30, 2008

(65) Prior Publication Data

US 2010/0051167 A1 Mar. 4, 2010

(51) Int. Cl.
| | |
|---|---|
| *B32B 38/00* | (2006.01) |
| *B64C 1/00* | (2006.01) |
| *B29C 70/00* | (2006.01) |
| *G06F 17/50* | (2006.01) |

(52) U.S. Cl.
CPC ............ *B29C 70/00* (2013.01); *G06F 17/5095* (2013.01); *G06F 2217/08* (2013.01); *G06F 2217/44* (2013.01); *Y02T 50/433* (2013.01); *Y02T 50/43* (2013.01)

(58) Field of Classification Search
USPC ............................................ 156/64; 244/133
See application file for complete search history.

(56) References Cited

U.S. PATENT DOCUMENTS

| | | | |
|---|---|---|---|
| 4,416,175 A | * | 11/1983 | Bettner et al. .................... 83/29 |
| 4,849,913 A | | 7/1989 | Ward et al. |
| 5,006,990 A | | 4/1991 | Ward et al. |
| 6,799,081 B1 | | 9/2004 | Hale et al. |
| 7,377,752 B2 | | 5/2008 | Mohamed |
| 2008/0083998 A1 | * | 4/2008 | Merrill et al. ................ 264/1.34 |

FOREIGN PATENT DOCUMENTS

| | | |
|---|---|---|
| WO | 2010025413 A2 | 3/2010 |
| WO | PCT/US2009/055433 | 6/2010 |

OTHER PUBLICATIONS

Makiyama, A.M.; Platts, M.J. "Toplogy Design for Composite Components of Minimum Weight." 1996. Applied Composite Materials, vol. 3. Kluwer Academic Publishers. pp. 29-41.*

Colson, Benoit; Bruyneel, Michael; Grihon, Stephanie. "Composite panel optimization with nonlinear finite-element analysis and semi-analytical sensitivities." Nov. 6-7, 2007. NAFEMS Seminar: Simulating Composite Materials and Structures. Bad Kissingen, Germany. pp. 1-11.*

Rajendran, S.; Song, D.Q. "Finite Element Modelling of Delamination Buckling of Composite Panel Using ANSYS." Nov. 11-13, 1998. Materials Technology Application Centre, Singapore Productivity and Standards Board. pp. 1-13.*

Colson et al., "Composite panel optimization with nonlinear finite-element analysis and semi-analytical sensitivities," NAFEMS Seminar, Bad Kissingen, Germany, Nov. 6-7, 2007, 11 pages.

Rajendran et al., "Finite Element Modelling of Delamination Buckling of Composite Panel Using ANSYS," Proceedings of 3nd Asian ANSYS User Conference, Nov. 11-13, 1998, Singapore, 13 pages.

* cited by examiner

*Primary Examiner* — Philip Tucker
*Assistant Examiner* — Vicki Wu
(74) *Attorney, Agent, or Firm* — Yee & Associates, P.C.

(57) ABSTRACT

The shape of a laminated composite structure is optimized using finite element analysis. The optimized shape minimizes the weight of the structure while satisfying minimum strength and stiffness requirements.

20 Claims, 13 Drawing Sheets

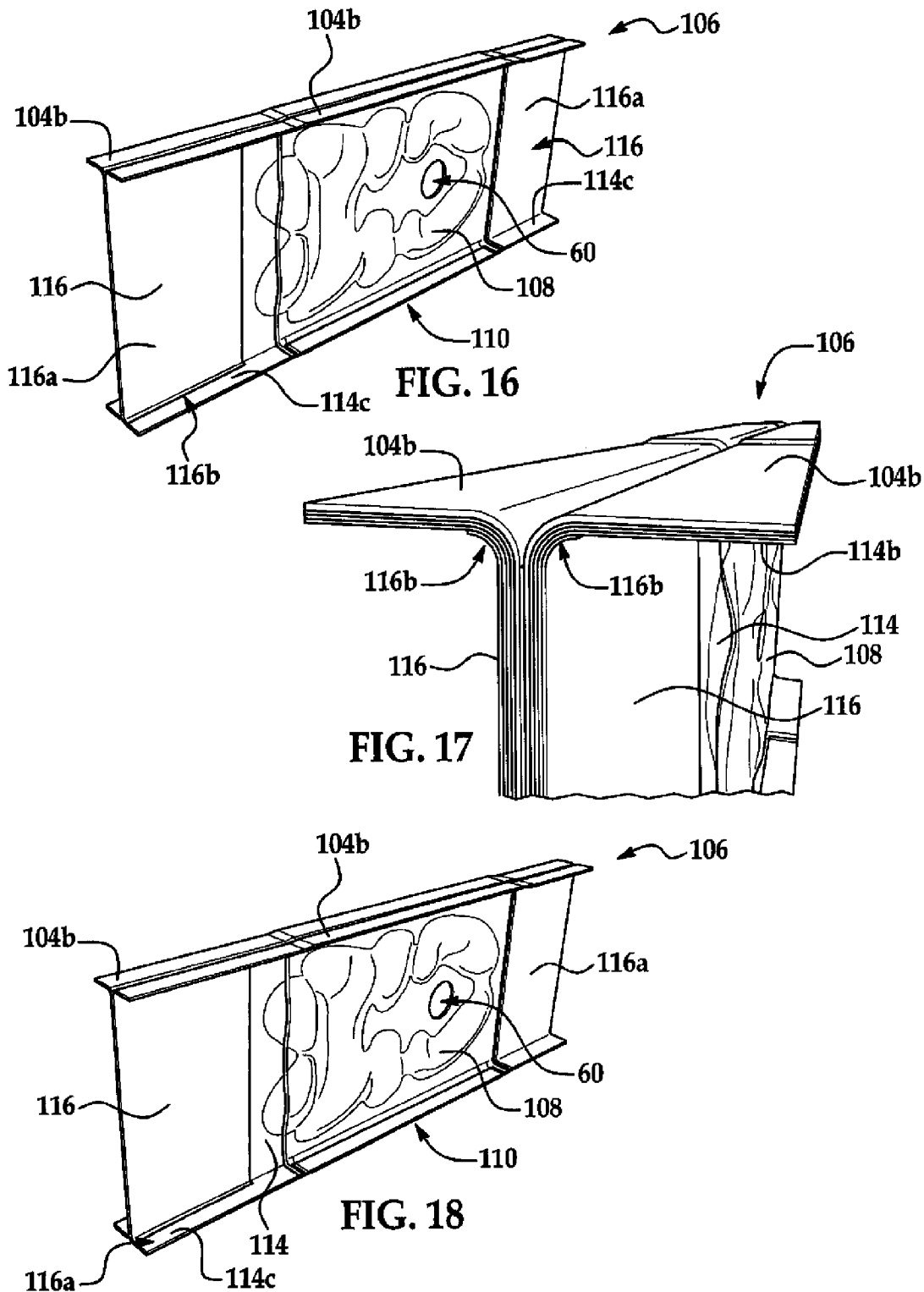

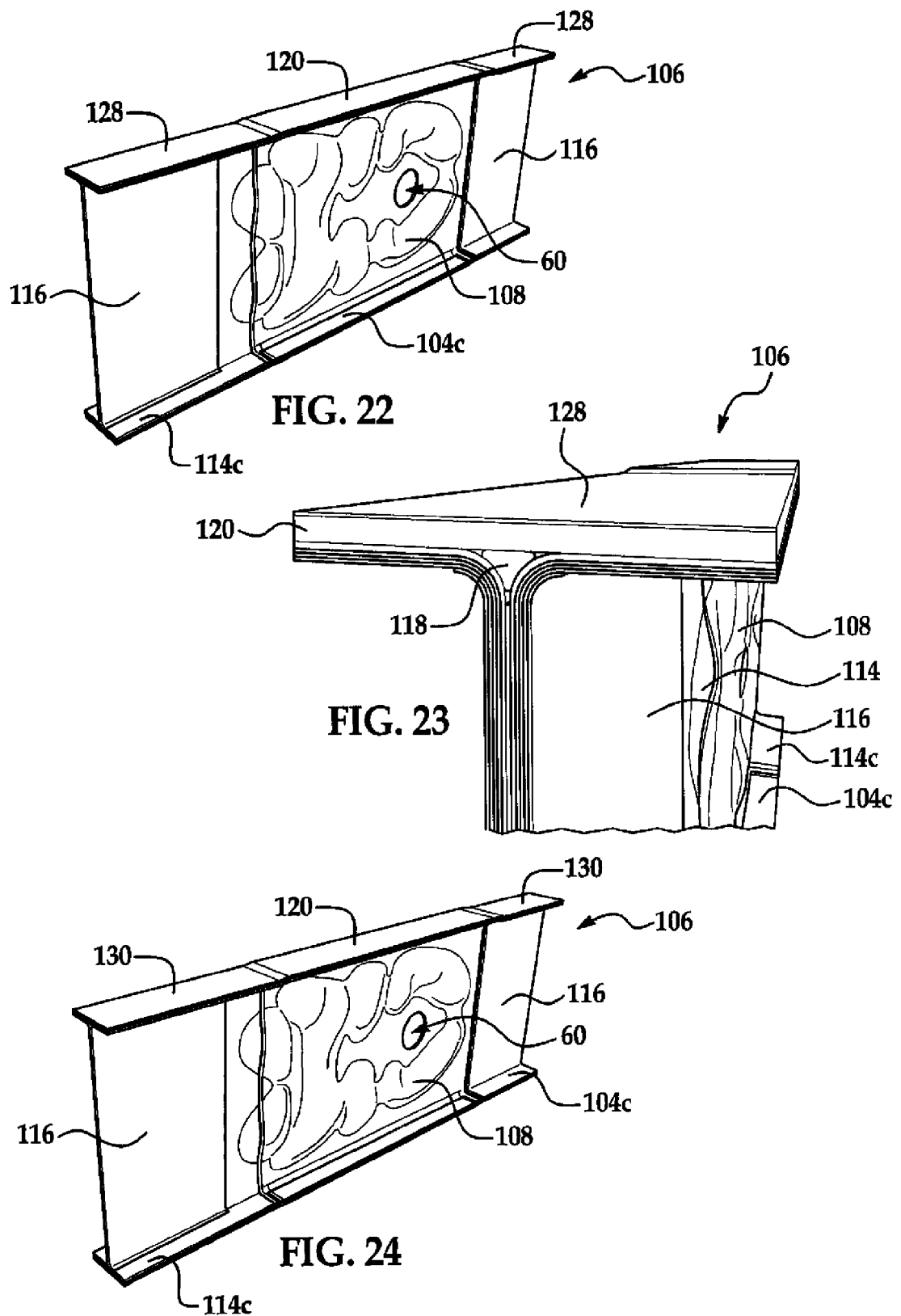

OPTIMIZING THE SHAPE OF A COMPOSITE STRUCTURE

TECHNICAL FIELD

This disclosure generally relates to techniques used to design and fabricate composite structures, and deals more particularly with a method for optimizing the shape of a composite structure to reduce weight while maintaining minimum strength and/or stiffness requirements.

BACKGROUND

Composite structures formed from laminated plies are typically designed to meet various requirements that may depend on the particular application. For example, in the aircraft industry, composite structures used to fabricate an airframe normally have minimum strength and stiffness requirements in order to meet performance and service life specifications. In designing such composite structures, it is often necessary to select the shape and orientation of the plies in order to provide adequate strength and stiffness in specific areas of the composite structure. The design process may rely heavily on the skill and experience of the designer to make the appropriate selections for the orientation, shape and the number of plies in order to assure that minimum performance criteria are met. In some cases, the design of laminated composite structures may consist of an iterative process in which various combinations of ply thicknesses and orientations are developed and tested before a final design meeting all performance requirements is selected. In some cases, the designer may specify a greater number of plies or thicker plies than is necessary to satisfy the minimum performance requirements. As a result, the current design process is not only time consuming, but may produce structural shapes that are not optimized for weight reduction.

Accordingly, there is a need for a method of optimizing the shapes of composite structures that result in minimum weight while meeting performance requirements, such as strength and stiffness.

SUMMARY

The disclosed embodiments provide a method of designing composite structures that may minimize weight by achieving the required structural strength and stiffness through shaping and material placement. The required strength and stiffness are defined through shaping and material placement. A single finite element analysis provides a weight optimized conceptual design that includes lay-up definition and a stiffening shape meeting minimum performance criteria for strength, stiffness and stability. Using conventional static finite element optimization analysis, a problem is formulated to minimize structural weight while maintaining strength and stability, and allowing the stiffening shape of the structure to change as well as the amount and direction of the composite laminate. Coarse results of the finite element analysis are then refined using a CAD (computer aided design) to smooth lay-up profiles.

According to one disclosed method embodiment, a composite structure is produced by: performing a finite element analysis to determine the shape of the structure that will minimize both the weight and satisfy strength requirements for the structure; shaping a plurality of composite plies based on the results on the finite element analysis; and, laminating the composite plies. Performing the finite element analysis may include identifying portions of the structure having a shape that may be designed, identifying a set of variables for portions of the shape that may be designed, and identifying a set of constraints for portions of the shape that may be designed. The finite element analysis may include running an optimization analysis to optimize the shape of the portions of the structure, using the set of design variables and the set of design constraints. The method may further comprise using computer aided design to refine the shape determined by the finite element analysis.

According to another disclosed method embodiment, optimizing the shape of a composite structure comprises: using finite element analysis to determine a shape for the structure that will minimize the weight of the structure and satisfy predetermined strength and stiffness requirements for the structure.

According to a further method embodiment, producing a composite structure, comprises: selecting a general shape for the structure; dividing the general shape of the structure into an assemblage of individual finite elements; selecting a minimum requirement for at least one structural property of the structure; and determining characteristics of the finite elements that will result in an optimized shape that minimizes the weight of the structure and satisfies the minimum requirement for at least one structural property. Determining the characteristics of the finite elements is performed using finite element analysis and the method may further comprise designing a composite multi-ply lay-up based on the determined characteristics of the finite elements.

Other features, benefits and advantages of the disclosed embodiments will become apparent from the following description of embodiments, when viewed in accordance with the attached drawings and appended claims

BRIEF DESCRIPTION OF THE ILLUSTRATIONS

Figure 3A:
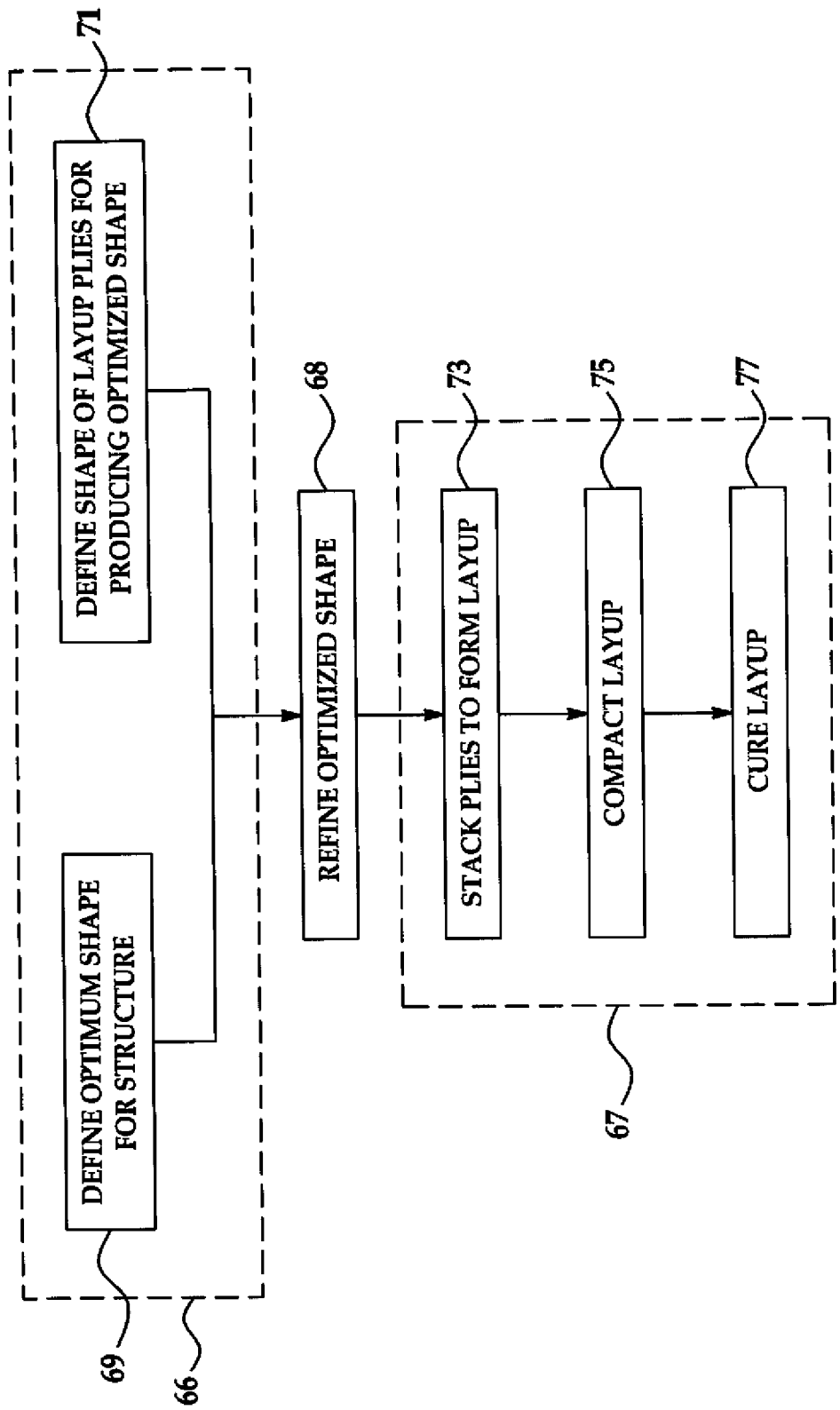
Figure 3B:
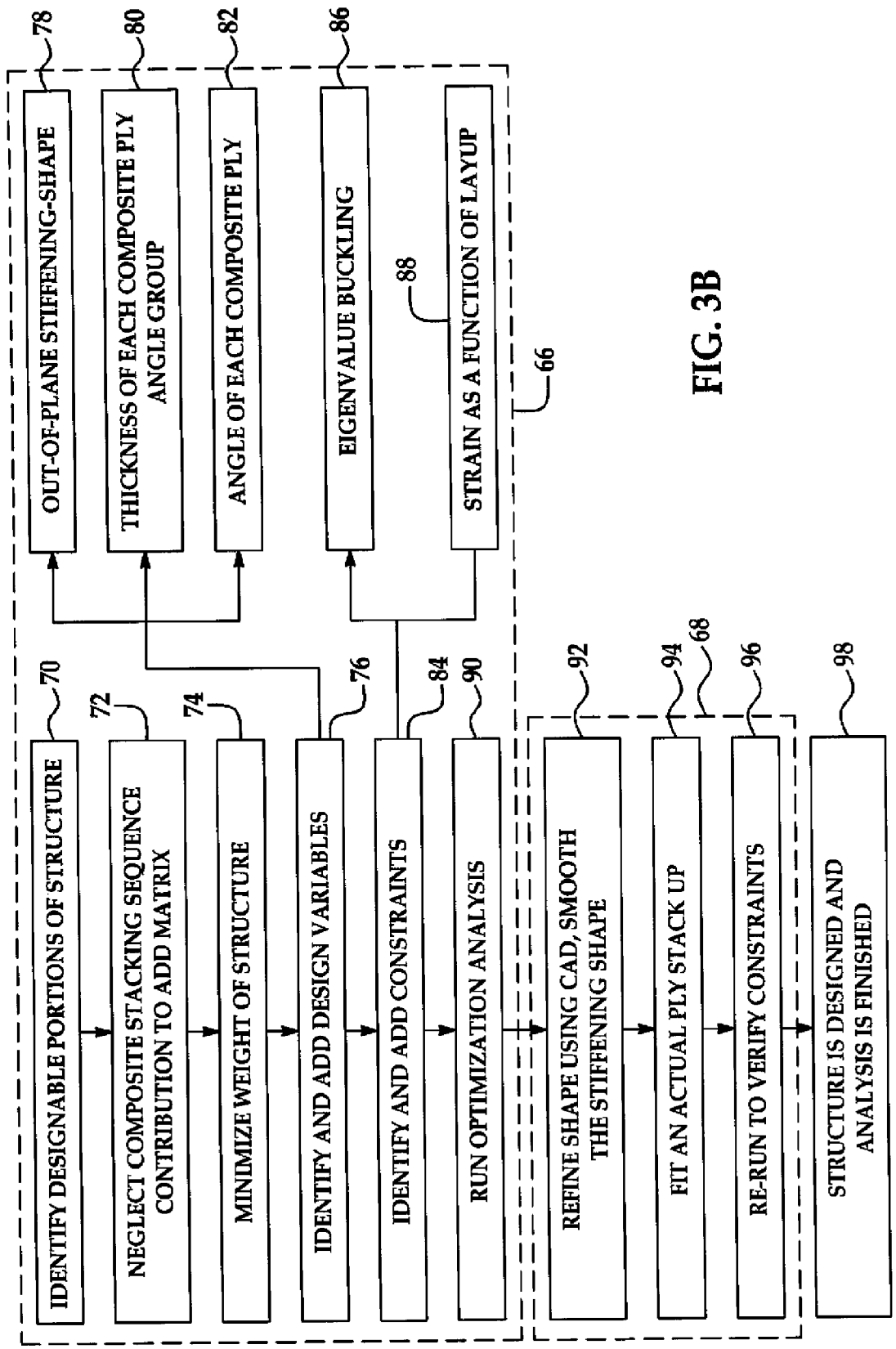

FIGS. 3*a* and 3*b* are simplified flow diagrams illustrating a method for optimizing the shape of a composite structure.

Figure 4:
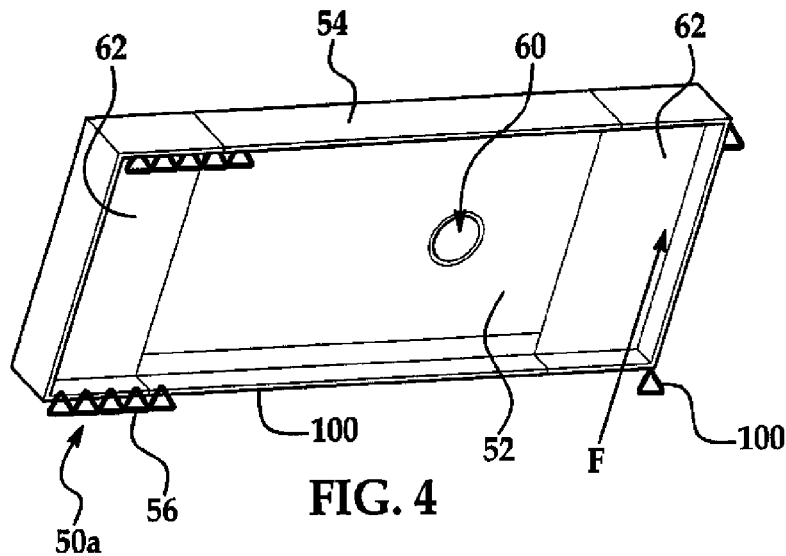

FIG. 4 is a perspective illustration of the general shape of a composite structure to be designed.

Figure 5:
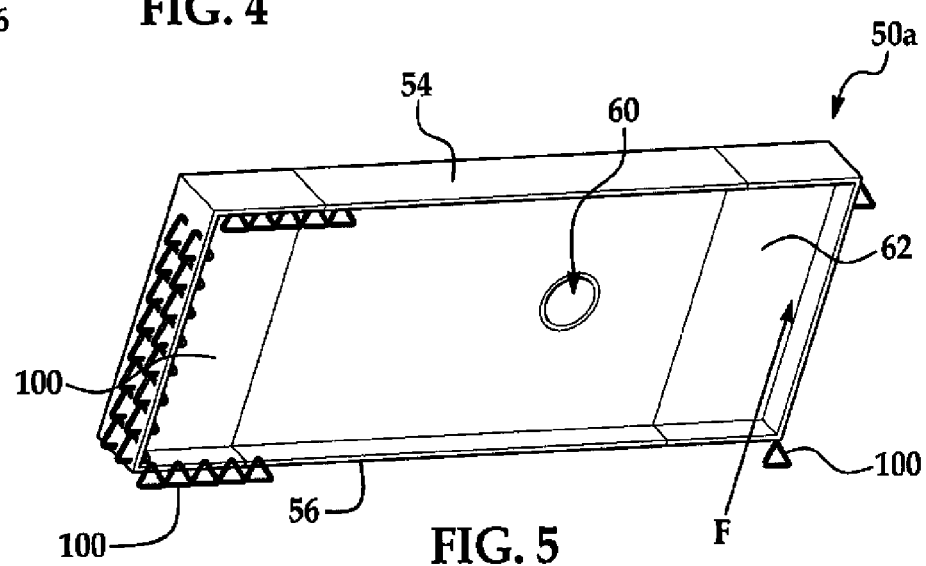

FIG. 5 is a view similar to FIG. 4 but illustrating ply stacking required to provide an optimized shape.

Figure 6:
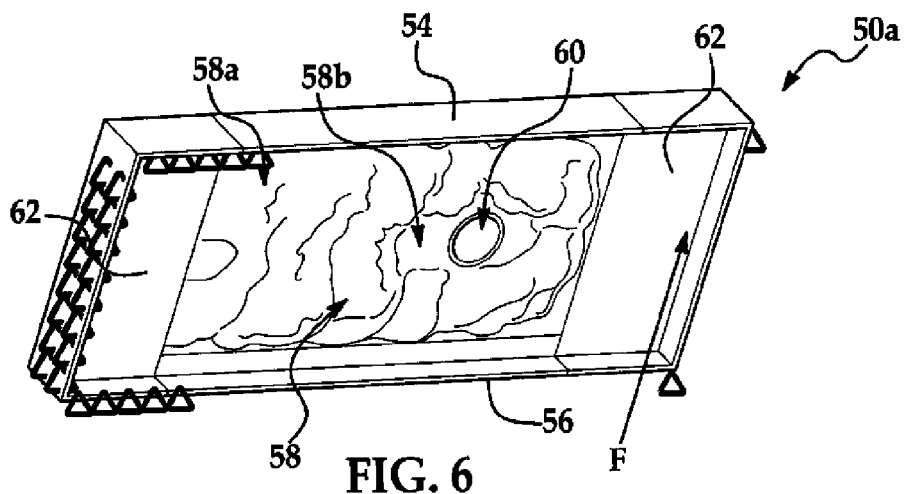

FIG. 6 is a view similar to FIG. 4 but illustrating the degree of stiffness of various areas of the structure.

Figure 1:
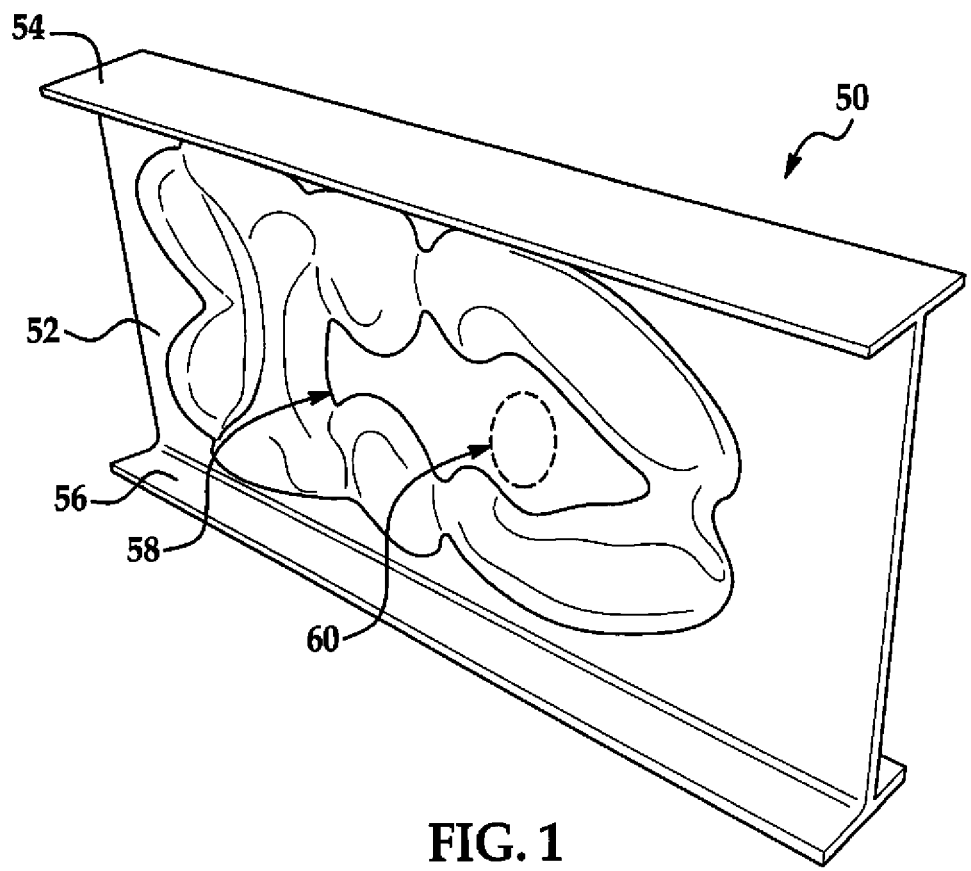
FIG. 1 is a perspective view of a laminated composite structure optimized according to the method of the disclosed embodiments.

FIGS. 7-27 are perspective views illustrating the shape and placement of plies used to form the composite structure shown in FIG. 1.

Figure 26:
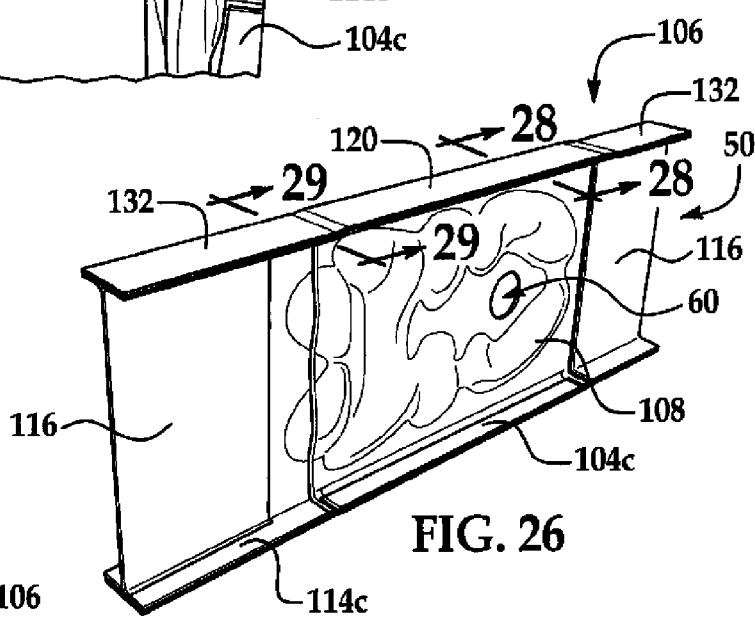
Figure 28:
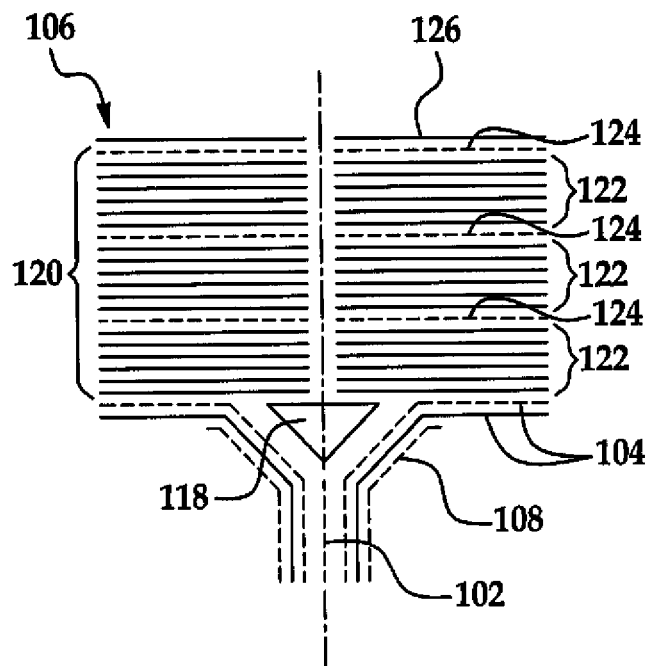

FIG. 28 is a sectional view taken along the line 28-28 in FIG. 26.

Figure 29:
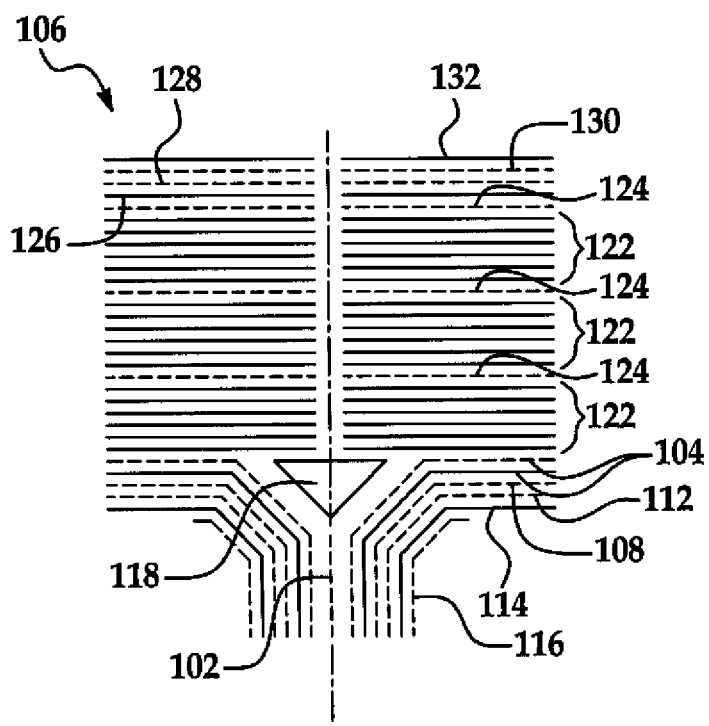

FIG. 29 is a sectional view taken along the line 29-29 in FIG. 26.

Figure 30:
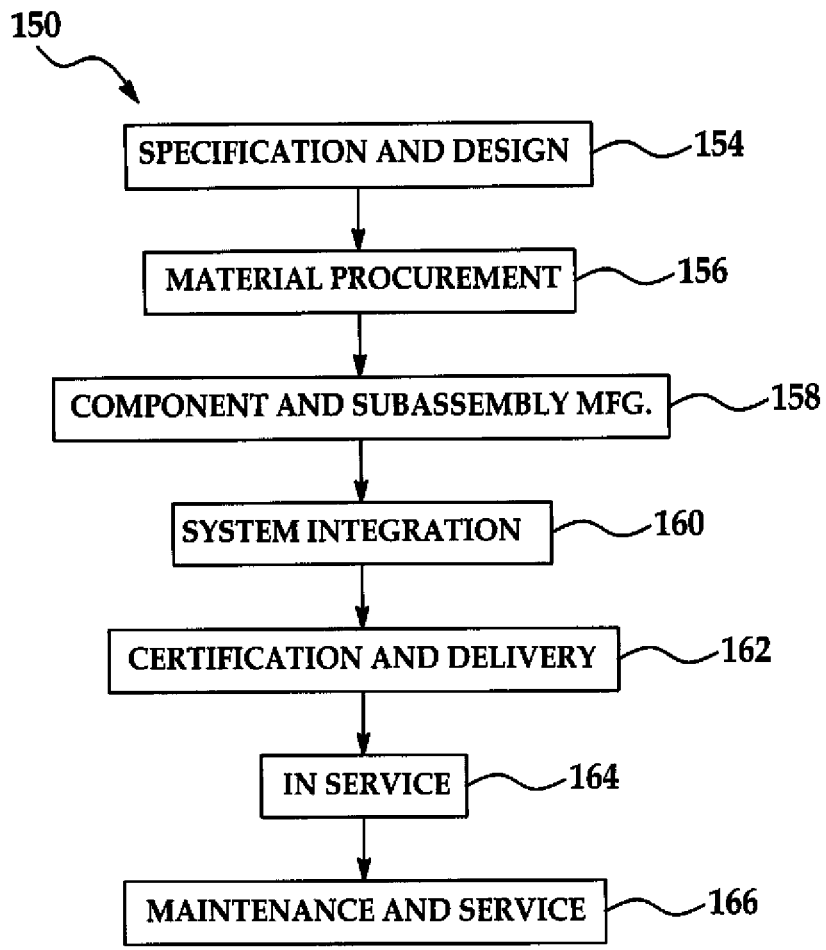

FIG. 30 is a flow diagram of aircraft production and service methodology.

Figure 31:
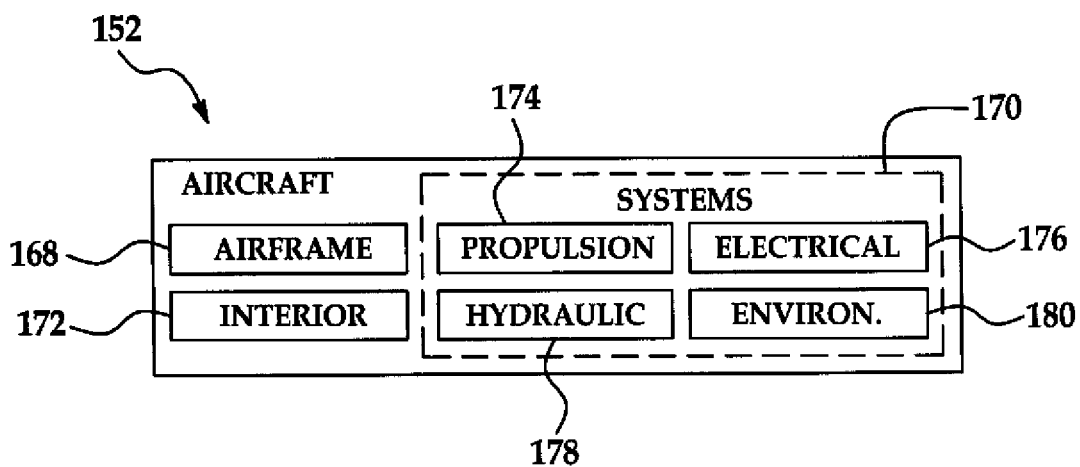

FIG. 31 is a block diagram of an aircraft.

DETAILED DESCRIPTION

Referring first to FIG. 1, the disclosed embodiments relate to a method of optimizing the shape of a composite structure, such as, and without limitation, an I-beam 50. The I-beam 50 is typical of composite structures and components used in the airframe 168 of an aircraft 152 shown in FIG. 31. The I-beam 50 includes a web 52 connecting upper and lower caps 54, 56, respectively. In accordance with the disclosed embodiments, the shape of the I-beam 50, and more particularly the shape 58 of the web 52 has been optimized so as to meet minimum structural performance requirements, such as, without limitation, strength and stiffness while minimizing weight. As will be discussed later in more detail, the illustrated I-beam 50 is designed to allow a circular opening 60 to be formed therein which might be required, for example and without limitation, to allow another structural member (not shown), pipes or electrical conduits to pass through the I-beam 50. The shape 58, as well as the ply build-ups required to form the shape 58 may be determined simultaneously using a finite element analysis. The finite element analysis is used to define the optimized shape of the structure, and composite plies are then shaped to form the optimized shape.

Figure 2:
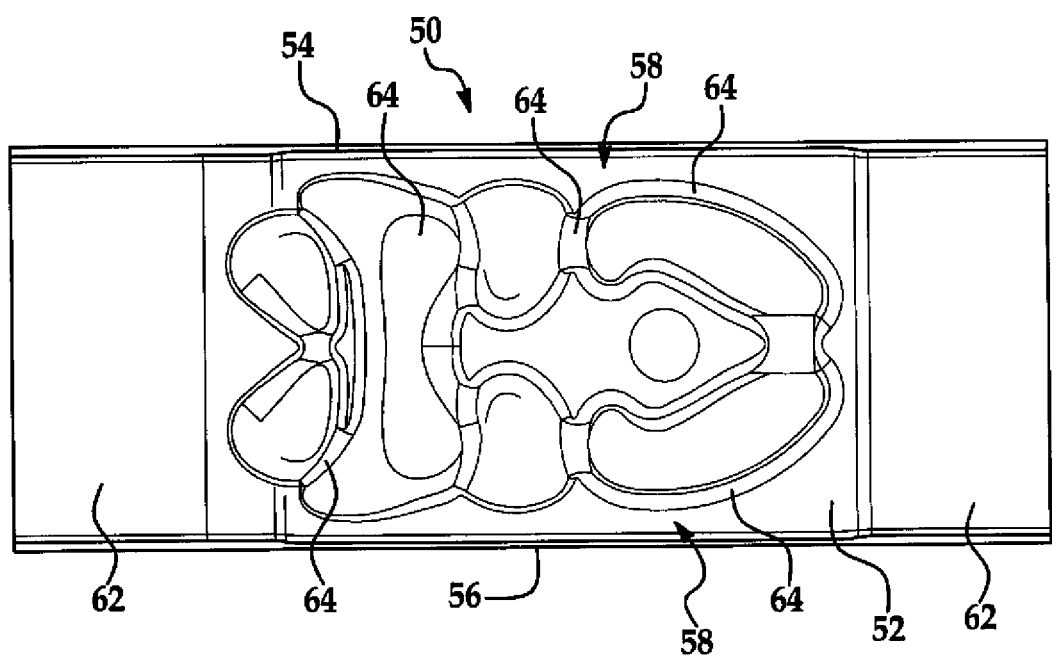
FIG. 2 is a side view of the structure shown in FIG. 1, but diagrammatically illustrating tailored ply build-ups used to optimize the shape of the structure.

FIG. 2 illustrates the outline of various shaped plies 64 that are stacked up to achieve the shape 58. In the illustrated example, the outer extremities 62 of the I-beam 50 form attachment points for use in performing load tests on the I-beam 50, however it is to be understood that the extremities 62 may also form an integral part of the I-beam 50 and may be attached to other sections of the airframe 168.

Reference is now made to FIG. 3a which broadly illustrates a method for optimizing the shape of, and for fabricating a composite structure. A finite element analysis is performed at 66 which defines the optimum shape for the structure (i.e. I-beam 50) at 69, while also shaping the plies in a layup that are needed to produce the optimized shape, shown at 71. The optimized shape is then refined at 68. The shaped plies are laminated at 67 to form the structure. The lamination 67 includes stacking the plies to form a layup at 73, compacting the layup at 75 and cuing the layup at 77.

FIG. 3b illustrates further details of the method shown in FIG. 3a. Broadly, as previously indicated, the method comprises performing a finite element model analysis 66 and then, at 68 refining the optimized shape by refining the results of the analysis performed at step 66. Finite element models (FEM) are commercially available software packages commonly used in structural simulations to visualize stiffness and strength while minimizing weight, material and costs. FEMs allows detailed visualization where structures bend or twist, and may indicate the distribution of stresses and displacements. Commercially available FEM software may provide a wide range of simulation options for controlling the complexity of both modeling and analysis of a system. The use of FEM allows an entire design to be constructed, refined and optimized before the design is actually manufactured. Generally, according to the concept of FEM, a body or structure may be divided into smaller elements of finite dimensions referred to as "finite elements". The original body or structure is then considered as an assemblage of these elements connected at a finite number of joints called nodes or nodal points. The properties of the elements are formulated and combined to obtain the properties of the entire body. The equations of equilibrium for the entire structure or body are then obtained by combining the equilibrium equation of each element such that the continuity is ensured at each node. The necessary boundary conditions are then imposed and the equations of equilibrium are solved to obtain the required variables such as stress, strain, and similar parameters.

Beginning at step 70, the designable portions of the modeled structure are identified and segregated. The designable portions of the structure are those portions that may be varied or "perturbed" in or out of their planes during the analysis to meet the minimum structural performance requirements while minimizing weight. Thus, in the case of the I-beam 50 shown in FIG. 1, the designable portions of the modeled structure may comprise the shape of the web 52 as well as the shape and/or thickness of the caps 54, 56. Next, at step 72, the model may be optionally adjusted to neglect any composite stacking sequence contribution to an ABD stiffness matrix. The ABD stiffness matrix, in which the letters "A", "B" and "D" each represent a matrix, is an analytic tool commonly used in laminate design that represents the constitutive relationship between the strains and curvatures to the in-plane forces and moments of a laminate. In the ABD matrix, A represents the in-plane stiffness properties, B is the coupling that arises between the bending and membrane action, and D represents the stiffness properties of the laminate. At 74, the model is setup to minimize the weight of the composite structure, following which design variables and constraints are added to the model at steps 76 and 84, respectively.

The design variables added at 76 may comprise any of a number of variables, depending upon the particular structure and application. In the present example, the design variables added to the model comprise out-of-plane stiffening shape at 78, the thickness of each composite ply angle group shown at 80 and the angle of each composite ply indicated at 82. Similarly, the constraints added at 84 will depend upon the particular structure and the application, but in the illustrated example, exemplary constraints comprise Eigenvalue buckling at 86, and at 88 a constraint comprising strain as a function of lay-up is added.

The model having been setup as described above, an optimization analysis is run at step 90. The result of the optimization analysis at step 90 is a 3-D model of the structure with the optimized shape that shows the thicknesses at various points of the structure that are required to produce a stiffening shape meeting the predetermined requirements for strength and stiffness. As will be described later in more detail, the generated material thicknesses may be visually displayed as relatively sharp thickness steps.

As discussed above, the 3-D model representing optimized shape resulting from the finite element analysis at 66 is then refined by a series of subsequent steps 68. More specifically, at step 92, using computer aided design, the sharp thickness steps defining the stiffening shape are smoothed. The stiffening shape having been smoothed, then at step 94, a CAD system can be used to fit an actual ply stack-up that would result in the stiffening shape that has been smoothed at step 92. Optionally, at step 96, the optimization analysis performed at 90 may be rerun to verify that the results of the initial optimization analysis are still valid following the steps performed at 92 and 94. Finally, at step 98, the design of the composite structure is completed and the analysis is finished.

FIG. 4 illustrates a model 50a that is used in the finite element analysis performed at 66 in FIGS. 3a and 3b. The designable portion of the model 50a in the illustrated example comprises the web 52 and the top and bottom caps 54, 56. The model 50a is an assemblage of individual finite elements 100 connected together.

FIG. 5 represents the result of the finite element analysis in which shades or colors may be used to represent the thicknesses of the designable portion of the model 50a. FIG. 6 also represents the result of the finite element analysis in which the stiffness of the stiffening shape 58 is indicated by topographic lines 58a or shading 58b.

Figure 7:
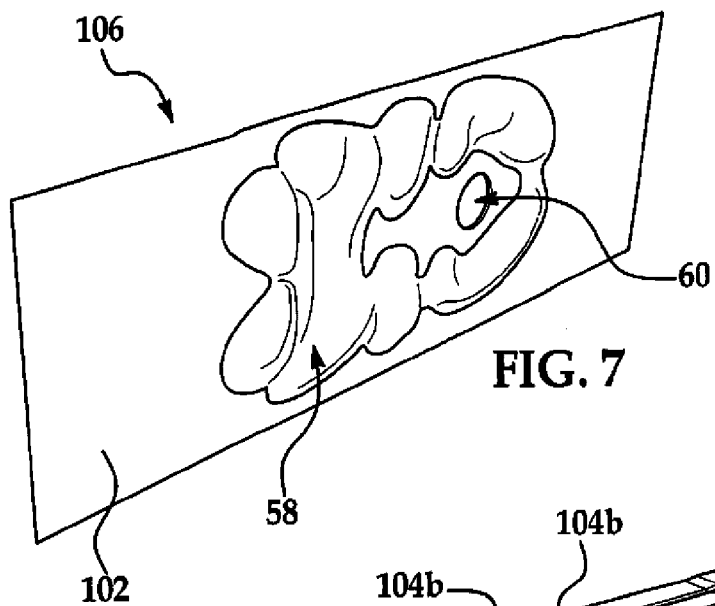

Using the modeled thicknesses and corresponding stiffness of the stiffening shape 58 respectively shown in FIGS. 5 and 6, a ply stack-up 106 is then designed which satisfies the results of the finite element analysis. Referring to FIG. 7, design of a ply stack-up 106 begins with a single center web ply 102 having a through-hole 60. The center web ply 102 may comprise reinforced fabric in which the fibers are oriented, for example and without limitation, at a 45 degree angle. Tooling (not shown) may be used to form the stiffening shape 58 in the center web ply 102.

Figure 8:
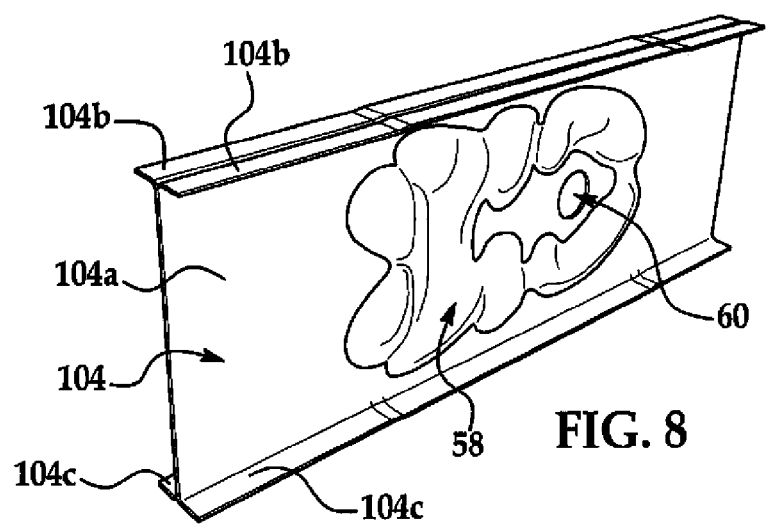
Figure 9:
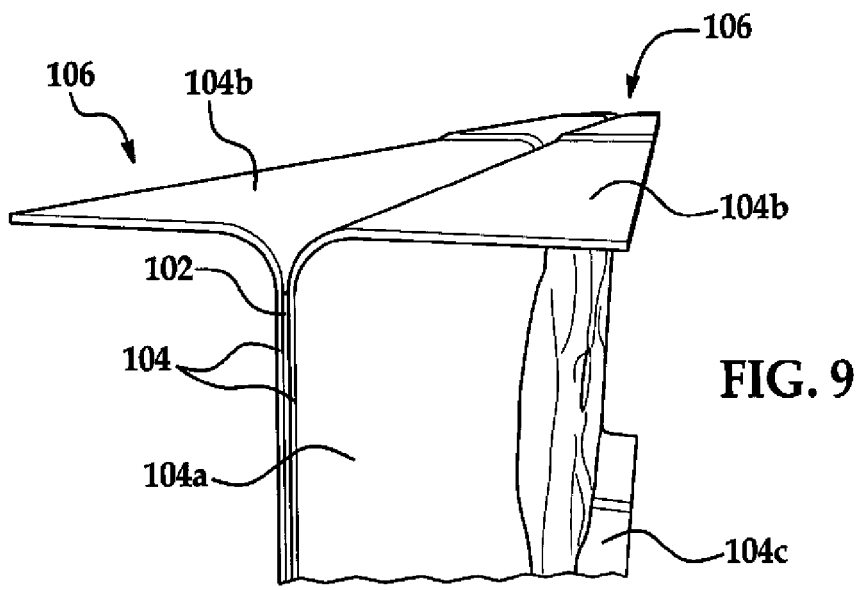

Referring now to FIGS. 8 and 9, the ply stack 106 further includes a pair of ply packs 104 each having a web portion 104a, and top and bottom flanges 104b, 104c respectively. The center web ply 102 is sandwiched between the web portions 104a of the web ply pack 104.

Figure 10:
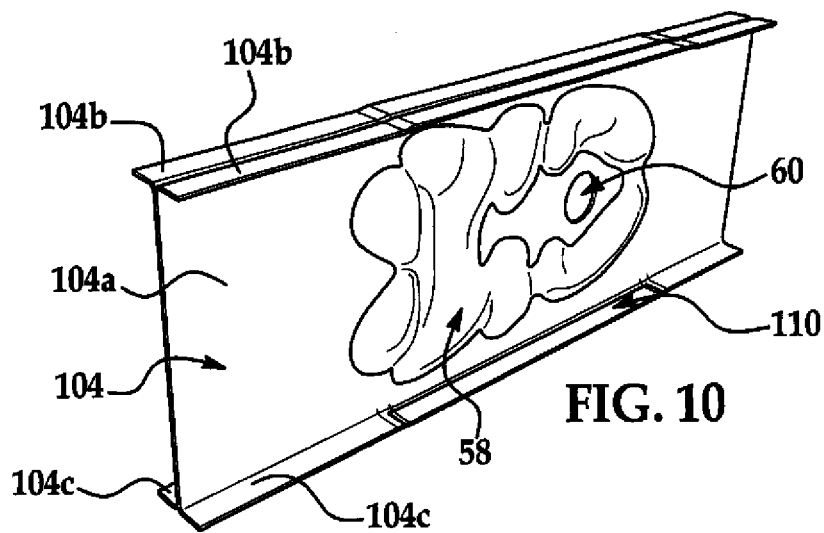
Figure 11:
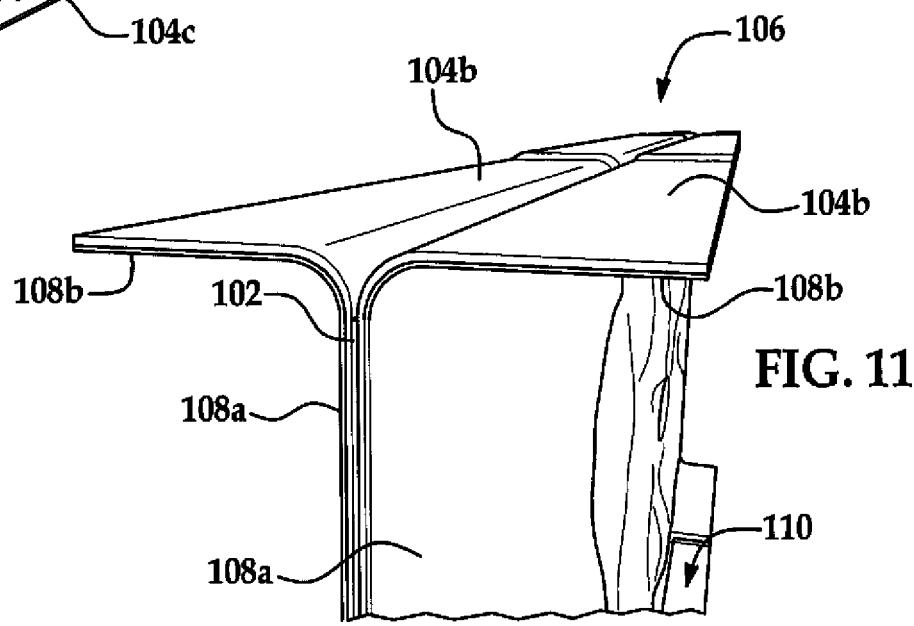

Referring also now to FIGS. 10 and 11, the ply pack 106 next includes another set of web plies 108 each having a web portion 108a and out-turned top and bottom flanges 108b and 108c. Each of the flanges 108b, 108c includes a central cutout area 110.

Figure 12:
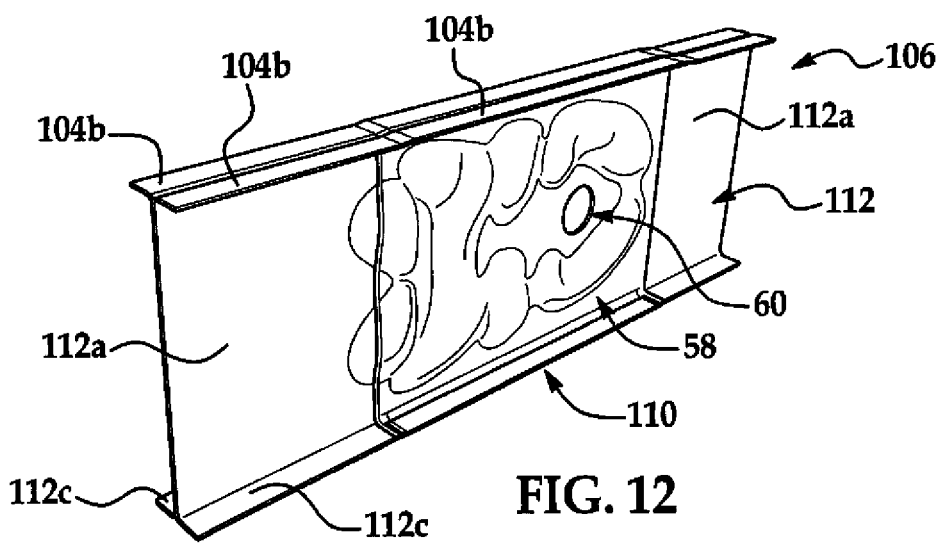
Figure 13:
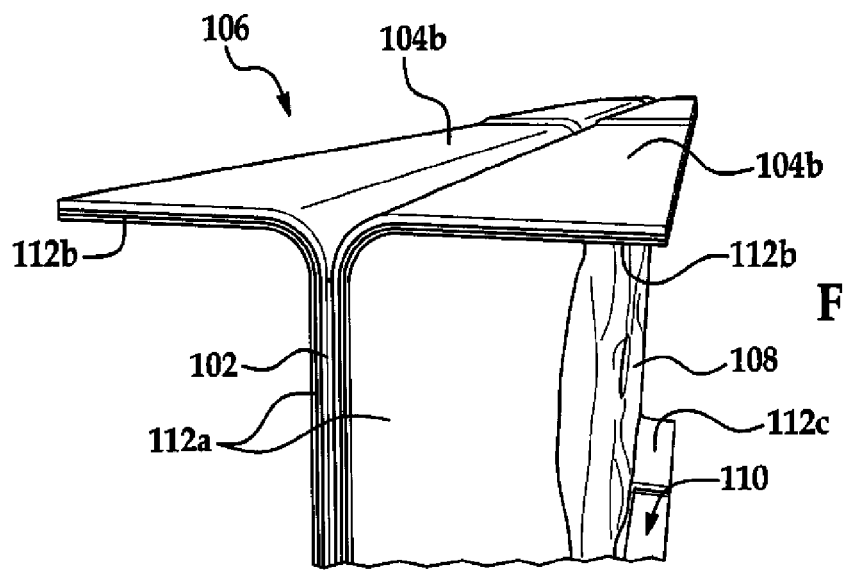

Referring now to FIGS. 12 and 13, the ply pack 106 further includes four, single fabric plies 112 each of which may have a 45 degree fiber orientation. Each of the plies 112 includes a web portion 112a and top and bottom flanges 112b and 112c.

Figure 14:
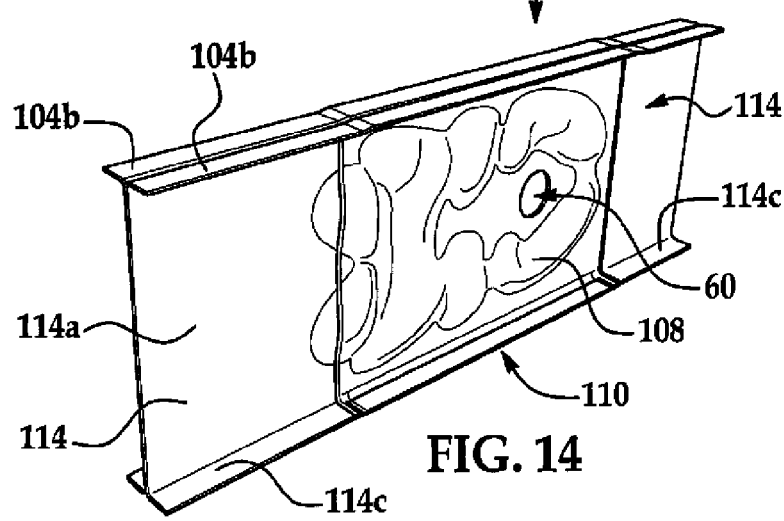
Figure 15:
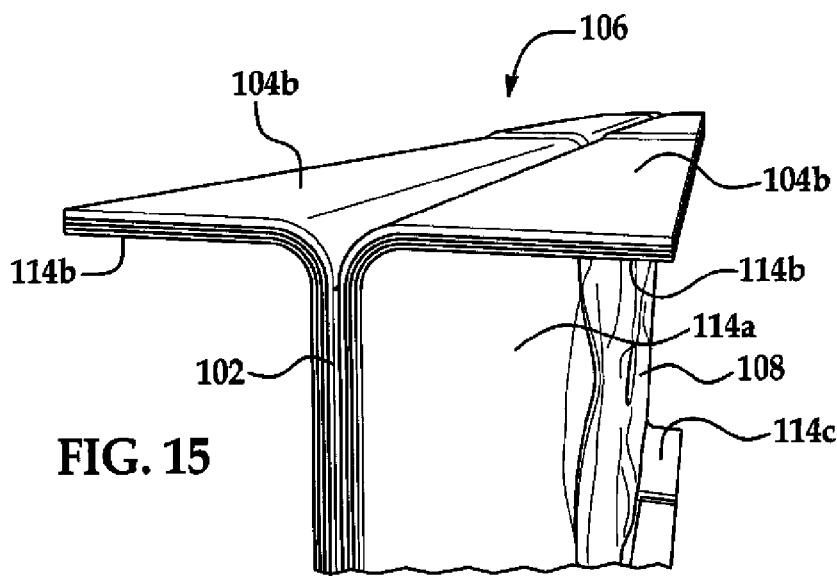

Referring now to FIGS. 14 and 15, the ply stack 106 further includes four additional fabric plies 114 having a zero degree fiber orientation. Each of the plies includes a web portion 114a and top and bottom flanges 114b and 114c.

Referring to FIGS. 16 and 17, the ply stack 106 further includes four single fabric plies 116 having a 45 degree fiber orientation. Each of the plies 116 includes a web portion 116a and radius portions 116b along the top and bottom edges thereof.

Figure 19:
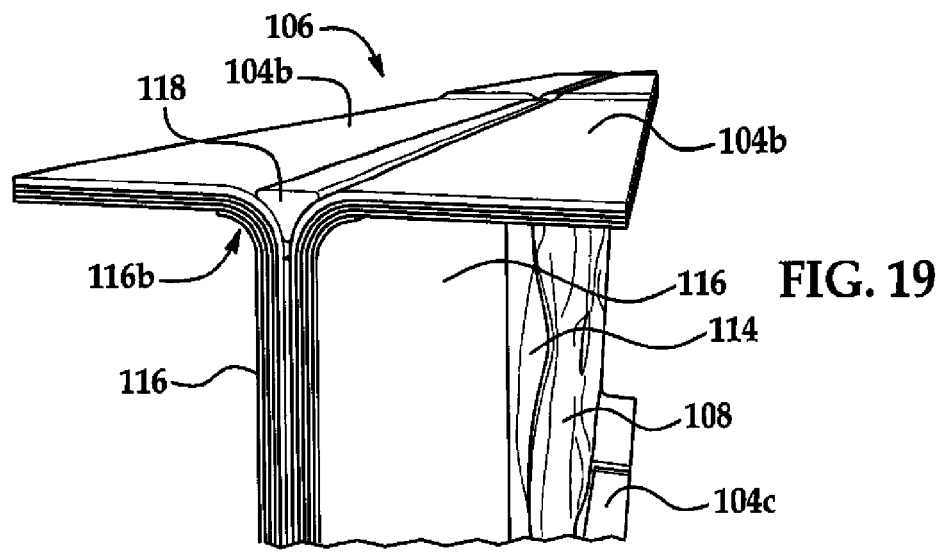

FIGS. 18 and 19 illustrate another component of the ply stack 106, comprising a pair of noodles 118 which form radius fillers in the top and bottom cap portions 104b, 104c.

Figure 20:
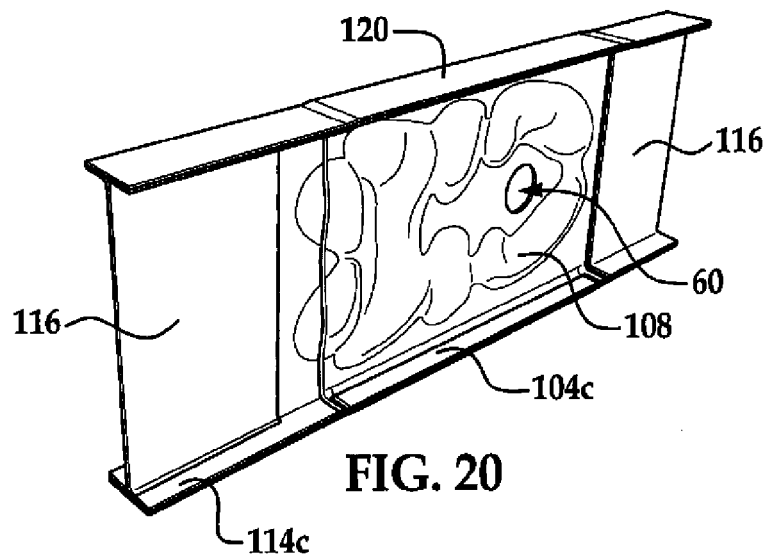
Figure 21:
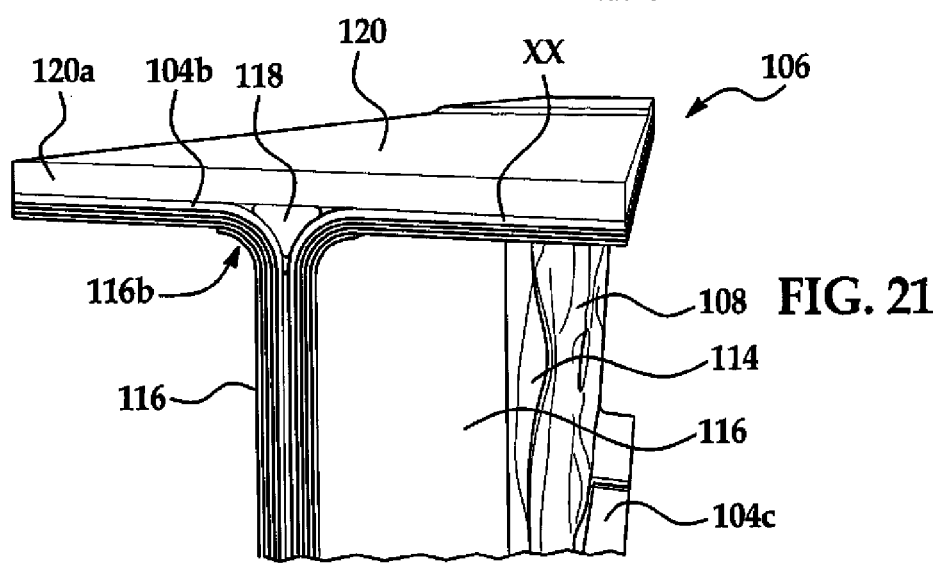

FIGS. 20 and 21 illustrate another component of the ply stack 106, comprising a ply pack 120 forming top and bottom caps 120a that run the entire length of the I-beam 50. The ply pack 120 may comprise multiple plies of material, as will be discussed later in more detail.

FIGS. 22 and 23 illustrate an additional component of the ply stack 106 comprising single plies 128 of fabric having a 45 degree fiber orientation which is placed over the ply pack 120 at two spaced apart locations.

Figure 25:
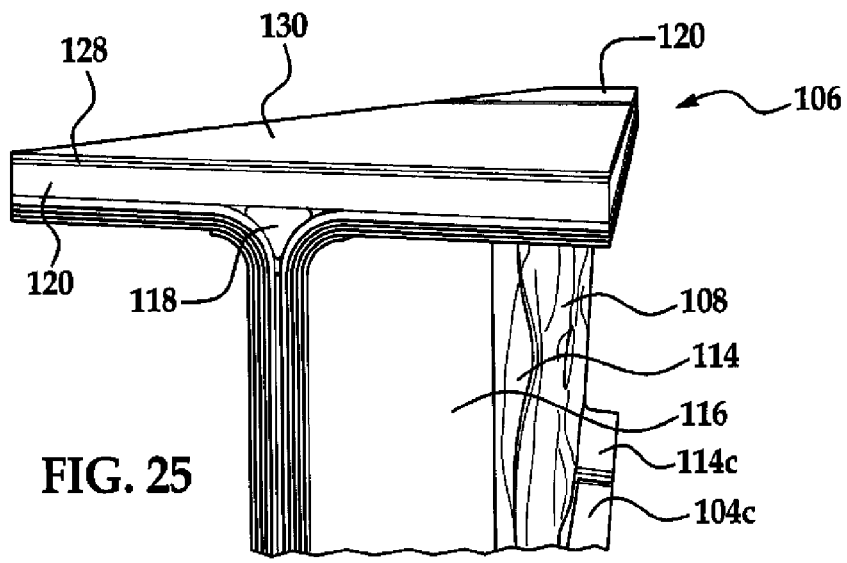

FIGS. 24 and 25 illustrate another component of the ply stack 106, comprising single plies 130 of fabric having a 45 degree fiber orientation placed over the plies 128 (FIGS. 22 and 23).

Figure 27:
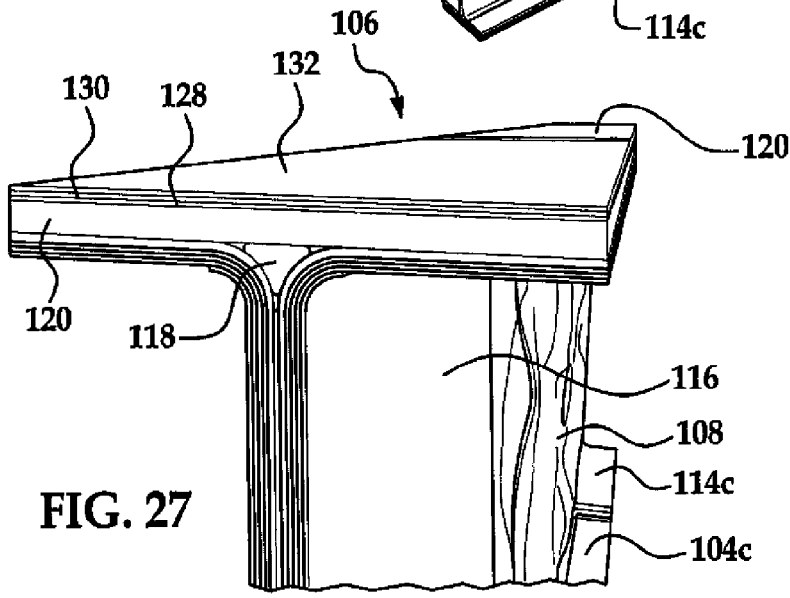

A final component of the ply stack 106 is shown in FIGS. 26 and 27, comprising four single fabric plies 132 having a zero degree fiber orientation which are respectively placed over the single plies 130 shown in FIGS. 24 and 25.

FIG. 28 illustrates the stacking sequence of the constituents of the ply stack 106 near the center of the I-beam 50. The previously described ply pack 120 comprises three stacks 122 of composite tape separated by fabric plies 124 having a 45 degree fiber orientation. A top ply or facesheet 126 comprises a zero degree orientation fabric ply. The ply group 104 previously described in connection with FIGS. 8 and 9 may comprise one ply of 45 degree fabric and a single ply of zero degree fabric. The single ply 108 previously described in connection with FIGS. 10 and 11 may comprise a single ply of 45 degree of orientated fabric.

FIG. 29 shows the stacking sequence of the constituent plies adjacent each end of the I-beam 50. Plies 128, 130 each comprise fabric having a 45 degree fiber orientation while ply 132 comprises a layer of fabric having a zero degree fiber orientation. Plies 108, 112 and 116, previously discussed, each may comprise a single layer of fabric having fibers orientated at 45 degrees, while ply 114 may comprise a single layer of fabric having a zero degree fiber orientation.

Embodiments of the disclosure may find use in a variety of potential applications, particularly in the transportation industry, including for example, aerospace, marine and automotive applications. Thus, referring now to FIGS. 30 and 31, embodiments of the disclosure may be used in the context of an aircraft manufacturing and service method 150 as shown in FIG. 30 and an aircraft 152 as shown in FIG. 31. During pre-production, exemplary method 150 may include specification and design 154 of the aircraft 152 and material procurement 156. During production, component and subassembly manufacturing 158 and system integration 160 of the aircraft 152 takes place. Thereafter, the aircraft 152 may go through certification and delivery 162 in order to be placed in service 164. While in service by a customer, the aircraft 152 is scheduled for routine maintenance and service 166 (which may also include modification, reconfiguration, refurbishment, and so on).

Each of the processes of method 150 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 31, the aircraft 152 produced by exemplary method 150 may include an airframe 168 with a plurality of systems 170 and an interior 172. Examples of high-level systems 176 include one or more of a propulsion system 174, an electrical system 176, a hydraulic system 178, and an environmental system 180. Any number of other systems may be included. Although an aerospace example is shown, the principles of the disclosure may be applied to other industries, such as the marine and automotive industries.

Systems and methods embodied herein may be employed during any one or more of the stages of the production and service method 150. For example, components or subassemblies corresponding to production process 88 may be fabricated or manufactured in a manner similar to components or subassemblies produced while the aircraft 82 is in service. Also, one or more apparatus embodiments, method embodiments, or a combination thereof may be utilized during the production stages 158 and 160, for example, by substantially expediting assembly of or reducing the cost of an aircraft 152. Similarly, one or more of apparatus embodiments, method embodiments, or a combination thereof may be utilized while the aircraft 152 is in service, for example and without limitation, to maintenance and service 166.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of producing a composite structure, comprising:
   selecting a general shape for said composite structure;
   performing a 3-D finite element analysis to determine a final shape of the structure that will both minimize weight of and satisfy strength requirements for the structure, said 3-D finite elements analysis comprising introducing an out-of-plane stiffening shape as a variable in said finite element analysis to produce a 3-D model of said structure;

shaping a plurality of composite plies in 3-dimensions based on the results of the 3-D finite element analysis, each of said plies having a unidirectional fiber orientation; and laminating the composite plies.

2. The method of claim 1, wherein performing the 3-D finite element analysis includes:

identifying portions of the structure having a shape that may be designed, identifying a set of design variables for the portions of the shape that may be designed, and identifying a set of design constraints for the portions of the shape that may be designed.

3. The method of claim 2, wherein performing the 3-D finite element analysis includes running an optimization analysis to optimize the shape of the portions of the structure, using the set of design variables and the set of design constraints.

4. The method of claim 2, wherein the set of design variables includes at least one of:

out-of-plane stiffening-shape, the thickness of each of the composite ply, and the angle of fiber orientation in each of the composite plies.

5. The method of claim 2, wherein the set of design constraints includes at least one of:

Eigenvalue buckling, and strain as a function of layup.

6. The method of claim 1, further comprising:

using computer aided design to refine the shape determined by the 3-D finite element analysis.

7. The method of claim 6, wherein refining the shape includes smoothing the shape determined by the 3-D finite element analysis.

8. The method of claim 1, wherein laminating the composite plies includes:

stacking the plies to form a layup, compacting the layup, and curing the layup.

9. The method of claim 1, wherein said composite structure comprises an aircraft airframe.

10. A method comprising:

selecting a general shape for a composite structure;

using 3-D finite element analysis to determine a final shape for the composite structure that will minimize the weight of the structure and satisfy predetermined strength and stiffness requirements for the structure, said 3-D finite elements analysis comprising introducing an out-of-plane stiffening shape as a variable in said 3-D finite element analysis to produce a 3-D model of said composite structure;

using the 3-D finite element analysis to define a multi-ply layup in 3-dimensions used to form the determined shape, each of said plies having a unidirectional fiber orientation; and shaping a plurality of composite plies in 3-dimensions to form the determined shape based on the multi-ply layup.

11. The method of claim 10, wherein determining the shape and defining the multi-ply layup are performed substantially simultaneously.

12. The method of claim 10, wherein using the 3-D finite element analysis includes:

identifying portions of the structure having a shape that may be designed, identifying a set of design variables for the portions of the shape that may be designed, and identifying a set of design constraints for the portions of the shape that may be designed.

13. The method of claim 12, wherein using the 3-D finite element analysis includes:

running an optimization analysis to optimize the shape of the portions of the structure, and using the set of design variables and the set of design constraints.

14. The method of claim 12, wherein the set of design variables includes at least one of:

out-of-plane stiffening-shape, the thickness of each of the composite ply, and the angle of fiber orientation in each of the composite plies.

15. The method of claim 10, further comprising:

using computer aided design to smooth the shape determined by using the 3-D finite element analysis.

16. A method of producing a composite structure, comprising:

selecting a general shape for the structure;

dividing the general shape of the structure into an assemblage of individual finite elements;

selecting a minimum requirement for at least one structural property of the structure; and determining characteristics of the finite elements that will result in an optimized shape in 3-dimensions that minimizes the weight of the structure and satisfies the minimum requirement for the at least one structural property, said determining characteristics comprising introducing an out-of-plane stiffening shape as a variable and using 3-D finite element analysis to produce a 3-D model of said structure;

designing a composite multi-ply layup based on the determined characteristics of the finite elements, each of said plies having a unidirectional fiber orientation; and shaping a plurality of composite plies in 3-dimensions into the composite structure having the optimized shape based on the multi-ply layup.

17. The method of claim 16, wherein the at least one structural property is one of;

strength, and stiffness.

18. The method of claim 16, further comprising:

selecting design variables for the structure;

selecting design constraints for the structure; and wherein determining characteristics of the finite elements is based on the selected design variables and the selected design constraints.

19. The method of claim 16, wherein said composite structure comprises an aircraft airframe.

20. A method of fabricating an airframe having an optimized shape that satisfies minimum strength and stiffness requirements while minimizing the airframe weight, comprising:

selecting a general shape for the airframe;

performing a 3-D finite element analysis to determine an approximate shape for the airframe that satisfies the minimum strength and stiffness requirements and minimizes the airframe weight, said finite elements analysis comprising introducing an out-of-plane stiffening shape to as a variable in said 3-D finite element analysis to produce a 3-D model of said structure;

using a CAD system to refine the approximate shape of the airframe;

producing a plurality of plies of composite material wherein each of the plies has a configuration in 3-dimensions based on the refined shape of the airframe, each of said plies having a unidirectional fiber orientation;

forming a layup using the plies; and, compacting and curing the layup.

* * * * *